United States Patent
Sambashivaiah et al.

(10) Patent No.: US 12,395,323 B2
(45) Date of Patent: Aug. 19, 2025

(54) ENCRYPTION OF PARAMETERS IN CONFIGURATION FILES

(71) Applicant: HEWLETT PACKARD ENTERPRISE DEVELOPMENT LP, Spring, TX (US)

(72) Inventors: Madhukesh Sambashivaiah, Karnataka (IN); Raghunandan Prabhakar, Karnataka (IN); Puneet Joshi, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 192 days.

(21) Appl. No.: 18/452,618

(22) Filed: Aug. 21, 2023

(65) Prior Publication Data

US 2025/0070959 A1    Feb. 27, 2025

(51) Int. Cl.
*H04L 9/08*    (2006.01)
*H04L 9/32*    (2006.01)

(52) U.S. Cl.
CPC .......... *H04L 9/0825* (2013.01); *H04L 9/3226* (2013.01); *H04L 9/3236* (2013.01)

(58) Field of Classification Search
CPC ... H04L 9/0825; H04L 9/3226; H04L 9/3236; H04L 9/0643
See application file for complete search history.

(56) References Cited

U.S. PATENT DOCUMENTS

| | | | |
|---|---|---|---|
| 6,654,889 B1* | 11/2003 | Trimberger | H04L 9/3236 |
| | | | 713/188 |
| 10,057,071 B2* | 8/2018 | Tschache | H04L 9/3247 |
| 10,469,251 B2 | 11/2019 | Wu et al. | |
| 10,492,045 B2* | 11/2019 | Li | H04L 9/3247 |
| 11,270,005 B2* | 3/2022 | Harrison | G06F 21/602 |
| 11,329,803 B2* | 5/2022 | Brooker | H04L 9/0894 |
| 2006/0182282 A1* | 8/2006 | Negahdar | H04L 63/045 |
| | | | 380/277 |
| 2017/0230183 A1* | 8/2017 | Sweet | H04L 9/0819 |
| 2018/0082076 A1* | 3/2018 | Murray | H04L 63/10 |
| 2019/0116496 A1* | 4/2019 | Catovic | H04W 12/06 |
| 2020/0396088 A1* | 12/2020 | Master | H04W 12/043 |
| 2021/0152351 A1* | 5/2021 | Anson | H04L 9/0869 |
| 2021/0391978 A1* | 12/2021 | Clinton | H04L 9/0631 |
| 2022/0035956 A1* | 2/2022 | Porter | G06F 21/73 |
| 2022/0103338 A1* | 3/2022 | Brooker | G06F 21/6218 |
| 2022/0350897 A1* | 11/2022 | Ho | G06F 21/602 |

FOREIGN PATENT DOCUMENTS

| | | |
|---|---|---|
| WO | 2021/084507 A1 | 5/2021 |
| WO | 2022/072283 A1 | 4/2022 |
| WO | 2022/237440 A1 | 11/2022 |

* cited by examiner

*Primary Examiner* — J. Brant Murphy
(74) *Attorney, Agent, or Firm* — Trop, Pruner & Hu, P.C.

(57) ABSTRACT

In some examples, a deployment server derives an initialization vector based on a protection parameter of a configuration file, and encrypts a vulnerable parameter of the configuration file using the initialization vector and an encryption key. The deployment server produces a protected configuration file including the protection parameter and the encrypted vulnerable parameter. The deployment server sends the protected configuration file to a device as part of an operation configuring the device according to the protected configuration file.

20 Claims, 4 Drawing Sheets

ENCRYPTION OF PARAMETERS IN CONFIGURATION FILES

BACKGROUND

A computing environment can include various electronic devices and/or virtual devices that are able to perform various operations. Examples of electronic devices include computers, smartphones, storage systems, communication nodes, game appliances, household appliances, vehicles, Internet-of-Things (IoT) devices, or other types of electronic devices. Virtual devices can refer to virtualized computing devices such as virtual machines or containers.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A device in a computing environment can be configured using a configuration file. A "device" can refer to an electronic device (which is a physical device) or a virtual device such as a virtual machine or a container. A "configuration file" refers to a data structure including a collection of one or more parameters that assigned values relating to various components of the device. The configuration file is applied at the device when the device is first set up in the computing environment. Alternatively, the configuration file is applied at the device when the configuration of the device is to be changed. Some parameters in the configuration file may not be protected against unauthorized access. As a result, an attacker (e.g., a user, a program, or a machine) may gain unauthorized access to the parameters in the configuration file when the configuration file is sent from a deployment server to the device. Moreover, the attacker may modify a parameter in the configuration file to misconfigure the device into misbehaving.

In accordance with some implementations of the present disclosure, a configuration file for configuring a device is protected by encrypting a collection of sensitive parameters in the configuration file. A "sensitive parameter" refers to a parameter that if modified can cause the device to operate in an unintended manner, which may raise security issues and/or may result in errors in a computing environment. The collection of sensitive parameters can be encrypted with an encryption key and an initialization vector that is based on one or more further parameters of the configuration file. Encrypting the collection of sensitive parameters using both the encryption key and the initialization vector reduces the likelihood that an attacker is able to apply brute force to recover the plaintext version of the sensitive parameters from the encrypted version of the sensitive parameters. The initialization vector is derived by applying functions (e.g., hash functions) on the further parameters of the configuration file. The combination of the further parameters selected for use in generating the initialization vector and the functions applied makes it unlikely that an attacker would be able to recreate the initialization vector even if the attacker has access to the configuration file. Computer functionality is improved by enhancing security using techniques or mechanisms according to some implementations of the present disclosure to protect the content of configuration files so that the content is protected against unauthorized use.

A "parameter" of a configuration file can refer to any information element in the configuration file that can be assigned to any of multiple possible values. A parameter can be in the form of a string, a collection of bits, or any other representation that can be assigned values. An "initialization vector" refers to any derived value that is generated based on a collection of inputs, such as parameters in a configuration file.

The protection of a configuration file using techniques or mechanisms according to some implementations of the present disclosure differs from traditional file signing. File signing can refer to a process in which the entire file is hashed and the hashed output is signed using a private key that generates a signature. The signature along with a certificate/public key is appended to the file and transmitted. File signing does not provide confidentiality to the parameters in the file but only provides integrity to prevent file tampering. Even with file scanning, the file can still be scanned by an attacker to know what is present in the file.

In contrast, the protection of the configuration file according to some implementations of the present disclosure uses at least one protection parameter in the configuration file to protect at least one vulnerable parameter in the configuration file.

Figure 1:
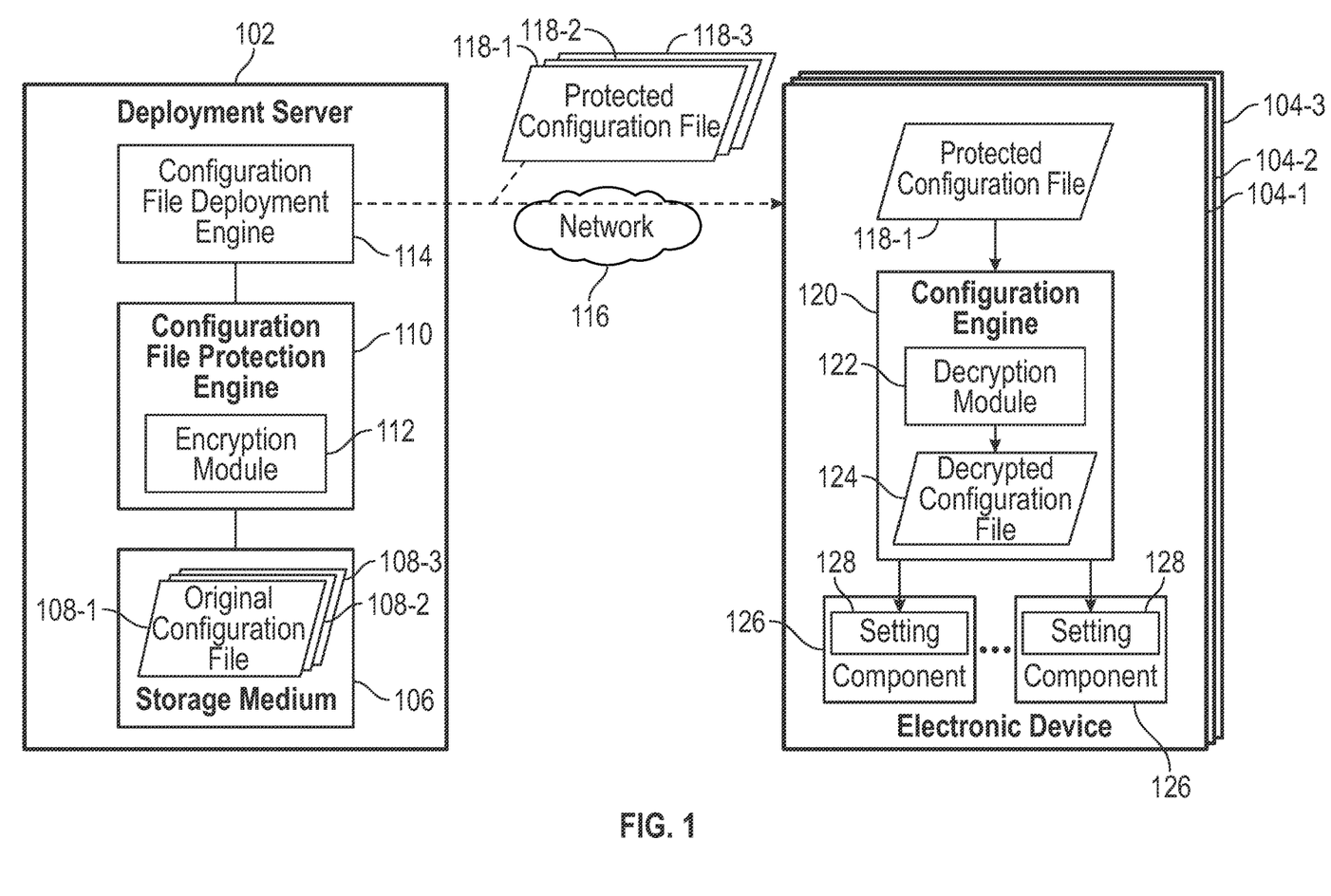
FIG. 1 is a block diagram of an arrangement that includes a deployment server to send protected configuration files to electronic devices of a computing environment, in accordance with some examples.

FIG. 1 is a block diagram of an example arrangement that includes a deployment server 102 and electronic devices 104-1, 104-2, and 104-3. Although FIG. 1 shows an example with three electronic devices, in other examples, a different quantity of electronic devices may be present. The electronic devices 104-1, 104-2, and 104-3 may be part of a computing environment. A "computing environment" can refer to any environment in which devices (including electronic devices and virtual devices) are able to communicate with one another and/or to perform target operations. In some examples, the computing environment can include sub-environments that are distributed across distant geographic locations. In other examples, the computing environment can be deployed within a physical facility, such as an office, a home, a factory, or any other type of physical environment.

The deployment server 102 includes a collection of computers (a single computer or multiple computers). The deployment server 102 is used to send, to the electronic devices 104-1 to 104-3, configuration files that are used to perform initial configuration of an electronic device.

Configuring an electronic device refers to setting up the electronic device to enable the electronic device to perform target operations. For example, components in the electronic device can be configured with settings according to parameters in a configuration file. Components of an electronic device can include any or some combination of the following: a processor, a memory device, a network interface controller or card (NIC), a storage device, a graphics device, an operating system (OS), other programs (e.g., an application program, firmware, a management program, or other types of machine-readable instructions), a file system, user information (e.g., a username and/or a password), or and/or other components.

An initial configuration of an electronic device refers to setting up the electronic device for the first time after the electronic device is added to a computing environment or otherwise is ready to be used. An updated configuration of an electronic device refers to modifying a configuration of the electronic device by changing settings of one or more components of the electronic device.

The deployment server 102 includes a storage medium 106 that stores original configuration files 108-1, 108-2, and 108-3 for the respective electronic devices 104-1, 104-2, and 104-3. The storage medium 106 can be implemented using one or more storage devices, such as disk-based storage devices, solid state drives, memory devices (e.g., dynamic random access memory (DRAM) devices, static random access memory (SRAM) devices, flash memory devices, or other types memory devices), or other devices that are able to store information.

Although reference is made to configuring electronic devices in some examples, it is noted that techniques or mechanisms according to further examples can be applied for configuration files for virtual devices such as virtual machines or containers. Components of a virtual machine can include virtual resources (e.g., a virtual processor, a virtual memory, a virtual NIC, a virtual storage, a virtual graphics device, or other virtual resources), an OS, other programs (e.g., an application program, firmware, a management program, or other types of machine-readable instructions), a file system, user information (e.g., a username and/or a password), and/or other elements of the virtual machine. Components of a container can include programs, user information, and/or other elements of the container.

An "original" configuration file refers to a configuration file prior to the application of encryption to one or more parameters of the configuration file. The number of original configuration files stored in the storage medium 106 can be dependent upon the number of electronic devices to be configured. In some cases, a configuration file can be used to configure a respective individual electronic device. In other cases, a configuration file can be used to configure multiple electronic devices.

In accordance with some implementations of the present disclosure, prior to sending a configuration file (e.g. one of the original configuration files 108-1 to 108-3) to a corresponding electronic device to configure the electronic device, a configuration file protection engine 110 in the deployment server 102 is able to protect one or more parameters of the configuration file by encrypting the one or more parameters.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The encryption of one or more parameters of an original configuration file is performed by an encryption module 112 in the configuration file protection engine 110. The encryption module 112 is implemented with a portion of the hardware processing circuitry of the configuration file protection engine 110, or with machine-readable instructions executable by the configuration file protection engine 110.

In accordance with some examples, the encryption module 112 encrypts at least one sensitive parameter of a configuration file using an encryption key and an initialization vector. The encryption key is based on at least a first parameter of the configuration file, and the initialization vector is based on at least a second parameter of the configuration file.

The configuration file protection engine 110 produces a protected configuration file based on an original configuration file in the storage medium 106. The protected configuration file includes the encrypted sensitive parameter (or multiple encrypted sensitive parameters) in place of a plaintext version of the sensitive parameter (or multiple plaintext versions of sensitive parameters) in the original configuration file.

The configuration file protection engine 110 provides the protected configuration file to a configuration file deployment engine 114 of the deployment server 102. The configuration file deployment engine 114 transfers the protected configuration file to a corresponding electronic device. For example, the configuration file can be sent from the deployment server 102 over a network 116 to the electronic device. The network 116 can include a local area network (LAN), a wide area network (WAN), a public network such as the Internet, or other types of communication media. In other examples, the configuration file deployment engine 114 and the configuration file protection engine 110 can be integrated into one engine. Additionally, in further examples, the network 116 can be omitted in examples where a protected configuration file is transferred between entities (including the deployment server 102 and devices to be configured) within a computer.

In examples according to FIG. 1, the configuration file protection engine 110 produces protected configuration files 118-1, 118-2, and 118-3 from original configuration files 108-1, 108-2, and 102-3, respectively. The protected configuration file 118-1 is sent by the deployment server 102 to the electronic device 104-1, the protected configuration file 118-2 is sent to the electronic device 104-2, and the protected configuration file 118-3 is sent to the electronic device 104-3.

Upon receiving a protected configuration file, an electronic device reverses the protection applied by the configuration file protection engine 110 of the deployment server 102. For example, the electronic device 104-1 includes a configuration engine 120 that is able to reverse the protection applied by the configuration file protection engine 110. The configuration engine 120 includes a decryption module 122 that is implemented using a portion of the hardware processing circuitry of the configuration engine 120, or with machine-readable instructions executable by the configuration engine 120.

The decryption module 122 decrypts the encrypted sensitive parameter of the protected configuration file 118-1. If the protected configuration file 118-1 includes multiple encrypted sensitive parameters, then the decryption module 122 decrypts the multiple encrypted sensitive parameters to produce respective plaintext versions of the sensitive parameters.

The decryption module 122 decrypts the protected configuration file by using an encryption key and an initialization vector derived from parameters of the protected configuration file 118-1. The decryption module 122 produces a decrypted configuration file 124 that corresponds to the protected configuration file 118-1. Using the parameters in the decrypted configuration file 124, the configuration engine 120 configures settings 128 of various components 126 of the electronic device 104-1. A "setting" can refer to an adjustable element of the component. For example, if the component is a hardware component, the adjustable element can be in the form of a register capable of storing a value that affects how the hardware component operates or affects an interaction of the component with another entity. As another example, if the component is a software component, the adjustable element can be in the form of a value stored in a memory that is retrievable by the software component as part of operations of the software component.

The other electronic devices (including 104-2 and 104-3) can include a configuration engine similar to the configuration engine 120 of the electronic device 104-1, for decrypting protected configuration files received by the other electronic devices from the deployment server 102.

Figure 2:
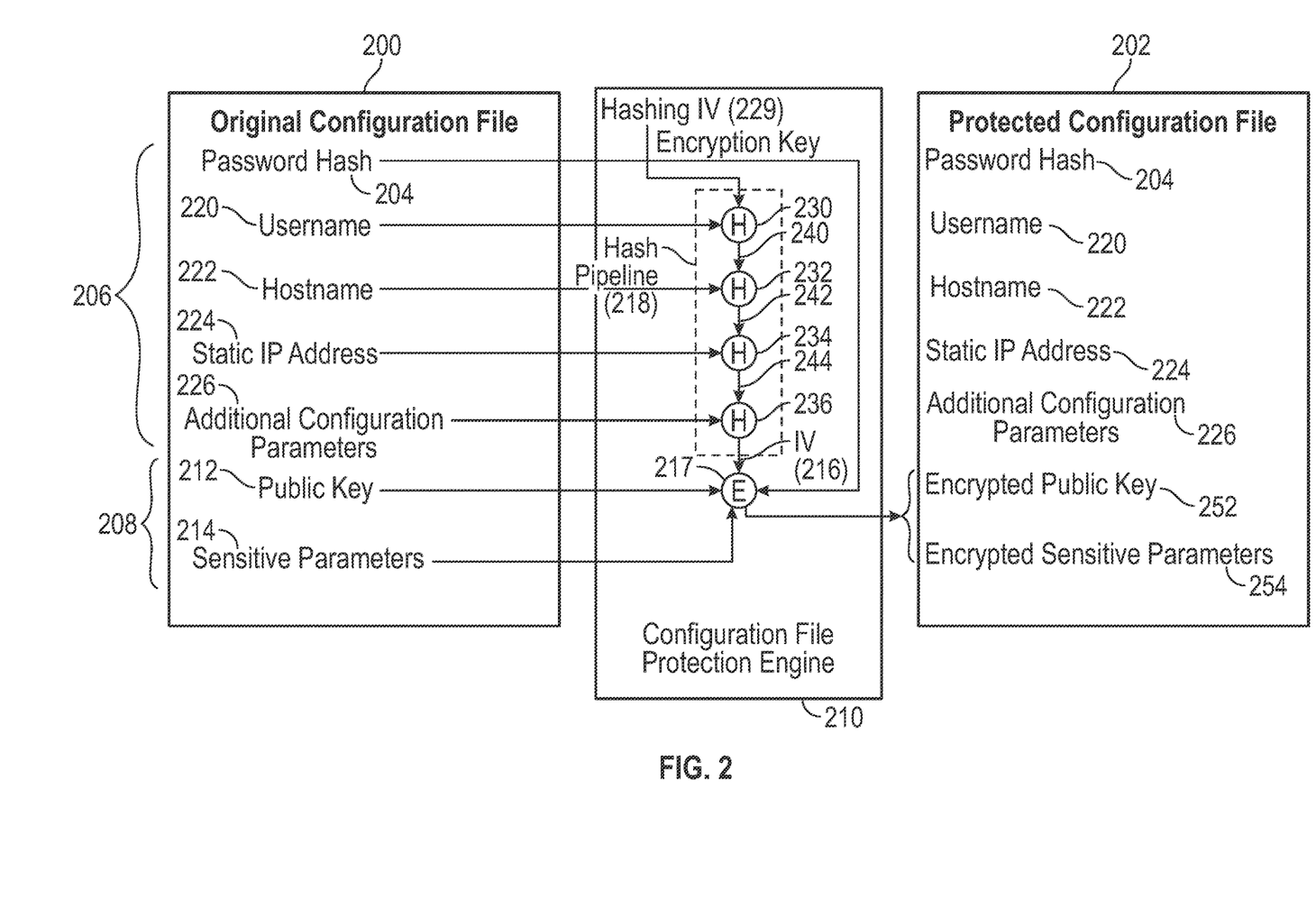
FIG. 2 illustrates an example of producing a protected configuration file form an original configuration file, according to some examples.

FIG. 2 shows an example of how a configuration file protection engine 210 produces a protected configuration file 202 from an original configuration file 200. The configuration file protection engine 210 is an example of the configuration file protection engine 110 of FIG. 1. The original configuration file 200 is an example of an original configuration file 108-1, 108-2, or 108-3 in FIG. 1. The protected configuration file 202 is an example of a protected configuration file 118-1, 118-2, or 118-3 in FIG. 1.

The original configuration file 200 includes a password hash 204 and a first collection of parameters 206. In some examples, the password hash 204 and the first collection of parameters 206 are not to be encrypted by the configuration file protection engine 210. The password hash 204 is produced by applying a hash function (e.g., a cryptographic hash function) on a password. A "password" can refer to any secret that can be used by a user or an electronic device to gain access to a resource, such as a network, a server, or any other type of resource.

The original configuration file 200 further includes a second collection of parameters 208 that are to be encrypted by the configuration file protection engine 210. The second collection of parameters 208 includes a public key 212 and sensitive parameters 214. A sensitive parameter in a configuration file is a parameter that is to be protected to prevent unauthorized access of the parameter.

Examples of the sensitive parameters 214 can include any or some combination of the following: an authentication parameter used to authenticate a source of a communication; an Internet Protocol (IP) address of a domain name system (DNS) server that provides an IP address in response to a domain name associated with an electronic device or Internet content; location information of a script or other machine-readable instructions to be executed by the electronic device; location information of a package containing machine-readable instructions that is to be installed in the electronic device; a network parameter relating to a network to be accessed by the electronic device; or other parameters.

Although specific examples of parameters of the original configuration file 200 are discussed herein, in other examples, other types of parameters can be included in the original configuration file 200.

At least some parameters of the first collection of parameters 206 are "protection parameters" that are used for protecting parameters of the second collection of parameters 208. For example, as discussed further below, the protection parameters are used to derive an initialization vector (IV) 216, which is used to encrypt parameters of the second collection of parameters 208. The parameters of the second collection of parameters 208 encrypted using the initialization vector 216 are referred to as "vulnerable parameters."

In some examples of the present disclosure, the password hash 204 is used as an encryption key by an encryption operator 217 of the configuration file protection engine 210. The encryption operator 217 is an example of the encryption module 112 of FIG. 1. In other examples, a different encryption key may be employed, where the different encryption key may be based on any information element in the original configuration file 200 and possibly one or more other input values.

The configuration file protection engine 210 further includes a hash pipeline 218 that produces the initialization vector (IV) 216 by applying hash functions on respective protection parameters of the first collection of parameters 206. In examples according to FIG. 2, the first collection of parameters 206 includes a username 220 that identifies a user, a hostname 222 that identifies an electronic device (such as any of the electronic devices 104-1 to 104-3 in FIG. 1), a static IP address 224, and additional configuration parameters 226.

A "static" IP address refers to an IP address that is statically assigned to an electronic device, such as by a LAN. The electronic device would use this static IP address every time the electronic device connects to the network. A static IP address differs from a dynamic IP address that can change with a connection of the electronic device to a network.

The additional configuration parameters 226 can include any or some combination of the following: subnet information referring to a subnet that an electronic device is to connect, a gateway address that includes an IP address of a gateway that the electronic device is to interact with, user group information to identify a user group that a user of an electronic device belongs to, storage device information referring to a setup of a storage device of the electronic device, file system information relating to a file system of the electronic device, and other parameters.

Note that some or all of the parameters in an original configuration file for a first electronic device can have different values from corresponding parameters in an original configuration file for a second electronic device.

The parameters 220, 222, 224, and 226 are provided to the hash pipeline 218. An "H" operator depicted in the hash pipeline 218 applies a respective hash function on a parameter. A first hash function 230 is applied on the username 220, to produce a first hash value 240. In some examples, the hash function 230 can further receive a hashing initialization vector 229. In such examples, the first hash function 230 is applied on the username 220 and the hashing initialization vector 229 (more specifically, the first hash function 230 is applied on a concatenation of the username 220 and the hashing initialization vector 229). The hashing initialization vector 229 can include or be derived from one or more protection parameters of the original configuration file 200, or alternatively, the hashing initialization vector 229 can include a different value.

A second hash function 232 is applied on the hostname 222 and the first hash value 240 (e.g., applied on a concatenation of the hostname 222 and the first hash value 240). The second hash function produces a second hash value 242. A third hash function 234 is applied on the static IP address 224 and the second hash value 242 (e.g., applied on a concatenation of the static IP address 224 and the second hash value 242). The third hash function 234 produces a third hash value 244.

A fourth hash function 246 is applied on an additional configuration parameter 226 and the third hash value 244 (e.g., applied on a concatenation of the additional parameter 226 and the third hash value 244). The fourth hash function 246 produces a final hash value that is provided as the initialization vector 216 for the encryption operator 217.

At least some of the hash functions 230, 232, 234, and 236 are different types of hash functions. Examples of different types of hash functions include any or some combination of the following cryptographic hash functions: a secure hash algorithm (SHA)-2 function, a keyed SHA-1 function, or other types of hash functions. In some examples, all of the hash functions of the hash pipeline 218 are different from one another. In other examples, at least two hash functions of the hash pipeline 218 are of different types from one another while at least two other hash functions of the hash pipeline 218 are of the same type.

Although four hash functions 230, 232, 234, and 236 are depicted as being part of the hash pipeline 218 in the example of FIG. 2, in other examples, the hash pipeline 218 can include a different quantity of hash functions applied successively on different parameters of the original configuration file 200. In other examples, other parameters of the original configuration file 200 can be used by the hash pipeline 218 to produce the initialization vector 216.

In further examples, instead of using hash functions applied on respective protection parameters of the original configuration file 200 to produce the initialization vector 216, the configuration file protection engine 210 can use a different pipeline of functions successively applied on respective protection parameters of the original configuration file 200 to produce the initialization vector 216.

An example of producing the initialization vector 216 by the encryption operator 217 is depicted below:

---
Hashing Initialization Vector (229) = Parameter_X,
HASH_1 = HASH_FN1(Parameter_1, Hashing Initialization Vector),
HASH_2 = HASH_FN2(Parameter_2, HASH_1),
...
HASH_m = HASH_FNm(Parameter_N, HASH_m-1),
Initialization Vector (216) = HASH_m.
---

In the foregoing sequence, the hash functions of the hash pipeline 218 are represented as HASH_FN1, HASH_FN2, . . . . HASH_FNm, where m represents the quantity of hash functions in the hash pipeline 218 (for example, m=4 in the specific example depicted in FIG. 2). The hash functions of the hash pipeline 218 produce m hash values HASH_1, HASH_2, . . . , HASH_m.

In the example above, parameter X is used as the hashing initialization vector 229. The hash function HASH_FN1 is applied on Parameter_1 (a first protection parameter) and the hashing initialization vector 229 to produce the hash value HASH_1, the hash function HASH_FN2 is applied on Parameter_2 (a second protection parameter) and HASH_1, and the hash function HASH_FN2 is applied on Parameter_N (the Nth protection parameter) and HASH_m-1 to produce hash value HASH_m. The hash value HASH_m is used as the initialization vector 216 by the encryption operator 217 to encrypt the public key 212 and the sensitive parameters 214 (the public key 212 and the sensitive parameters 214 are examples of vulnerable parameters to be protected).

The configuration file protection engine 210 produces the protected configuration file 202. The protected configuration file 202 includes the following information elements in unencrypted form (i.e., in plaintext form): password hash 204, the username 220, the hostname 222, the static IP address 224, and the additional configuration parameters 226.

The protected configuration file 202 includes an encrypted public key 252 produced by encrypting the public key 212 using the encryption key (the password hash 204) and the initialization vector 216. The protected configuration file 202 includes encrypted sensitive parameters 254 produced by encrypting the public key 212 using the encryption key (the password hash 204) and the initialization vector 216.

In further examples, to further reduce the likelihood that an attacker is able to recreate the initialization vector 216, the hash functions in the hash pipeline 218 can further use salts as inputs to randomize the hash values produced by the hash functions. In some examples, a salt can be derived from one or more parameters in the first collection of parameters 206 based on applying a hash function on the one or more parameters, where the hash function is different from the hash functions of the hash pipeline 218. In further examples, a salt includes a pseudo-random number that is generated by a pseudo-random number generator in the configuration file protection engine 210. The configuration file protection engine 210 may decide whether to use a pseudo-random number generator or one or more parameters of the original configuration file 200 based on the quantity of parameters in the first collection of parameters 206. If there are an insufficient quantity of parameters in the first collection of parameters 206 (e.g., the parameters of the first collection of parameters 206 are used in the hash pipeline 218), the configuration file protection engine 210 may use the pseudo-random number generator to generate a salt.

In examples where a pseudo-random number is generated for deriving a salt, the salt is added in the protected configuration file 202. For example, adding the salt in the protected configuration file 202 can be implemented by appending a hash string (say the password hash) with the salt (a random number string). The decryption module 122 (FIG. 1) can detect the extra characters in the modified hash string as the random number that is used as the salt.

An example of how salts can be used to produce the initialization vector 216 is set forth below:

---
Hashing Initialization Vector (229) = Parameter_X,
HASH_1 = HASH_FN1(Parameter_1, Hashing Initialization Vector, Salt_1),
HASH_2 = HASH_FN2(Parameter_2, HASH_1, Salt_2),
...
HASH_m = HASH_FNm(Parameter_N, HASH_m-1, Salt_m),
Initialization Vector (216) = HASH_m.
---

In the above examples, the salt values used by respective hash functions HASH_FN1, HASH_FN2, . . . , HASH_FNm are represented as Salt_1, Salt_2, . . . , Salt_m. In examples where salts are used to produce the initialization vector 216, the salts are sent in the protected configuration file 202 to an electronic device. The receiving electronic device uses the salts in the protected configuration file 202 in recreating the initialization vector 216 at the receiving electronic device. The salts are not encrypted in the protected configuration file 202.

The selection of the hashing initialization vector 229, P (P≥2) parameters (e.g., 220, 222, 224, 226) to use in combination with the use of Q (Q≥2) different hash functions in the hash pipeline 218 for producing the initialization vector 216 results in a large combination of possible permutations of how the initialization vector 216 is generated based on the content of the original configuration file 200. Even if an attacker has a copy of the original configuration file 200, it would be infeasible for the attacker to recreate the initialization vector 216 given the large combination of possible permutations of how the initialization vector 216 is generated.

The addition of salts (e.g., Salt_1 to Salt_m above) provides even more possible permutations of how the initialization vector 216 is generated. Additionally, more variations can be introduced for generating the initialization vector 216 by varying what portions of parameters of the original configuration file 200 are used in generating the initialization vector 216. For example, a truncated portion of a parameter can be used as an input to a hash function of the hash pipeline 218, or a parameter may be padded with additional bits to produce an expanded version of the parameter that is used as an input to a hash function of the hash pipeline 218.

Note that the initialization vector 216 itself is not communicated outside the configuration file protection engine 210. Rather, the initialization vector 216 is an internally generated value in the configuration file protection engine 210. The configuration file protection engine 210 can be protected against unauthorized access.

The decryption module 122 in the configuration engine 120 of the electronic device 104-1 (FIG. 1) (or similar decryption modules in other electronic devices) can reverse the encryption of the sensitive parameters in a protected configuration file received from the deployment server 102. The decryption module 122 can be programmed with the algorithm that includes use of a hash pipeline (similar to the hash pipeline 218) to produce an initialization vector based on parameters in the received protected configuration file (such as parameters 220, 222, 224, and 226 in the protected configuration file 202). The decryption module 122 can be programmed with an encryption operator (that reverses the encryption applied by the encryption operator 217) to decrypt the encrypted sensitive parameters in the received protected configuration file (such as the encrypted public key 252 and the encrypted sensitive parameters 254 in the protected configuration file 202).

Figure 3:
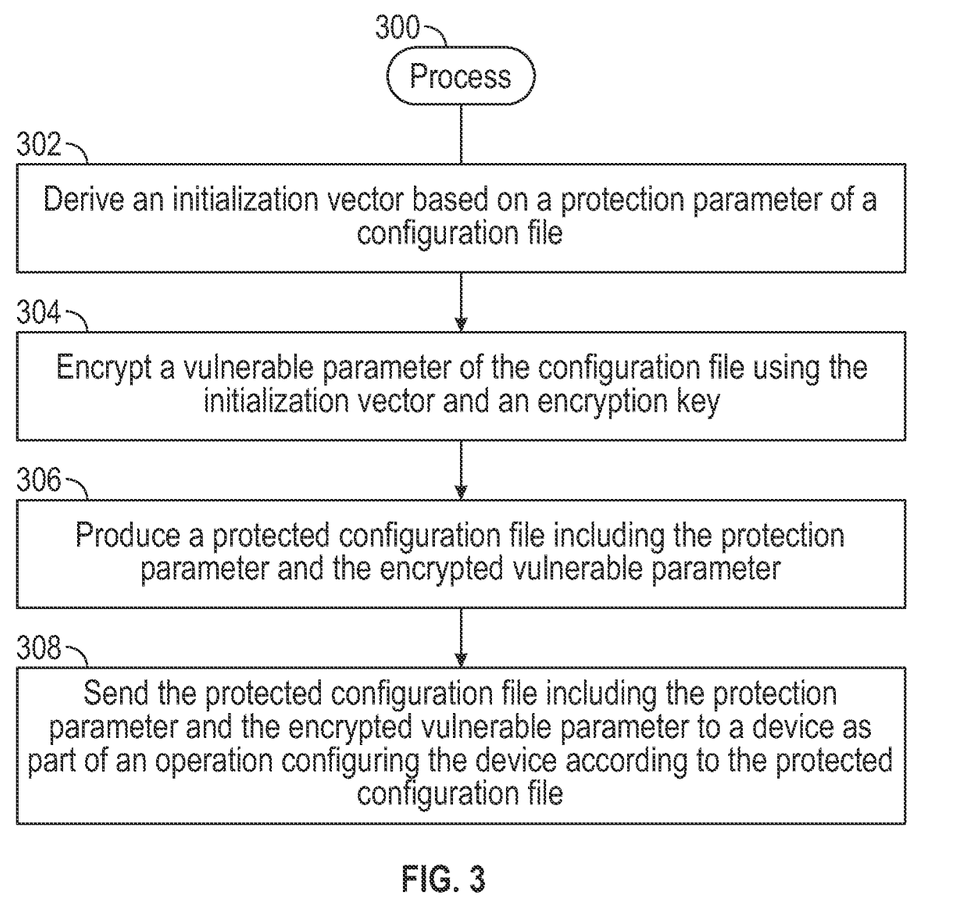
FIG. 3 is a flow diagram of a process according to some examples.

FIG. 3 is a flow diagram of a process 300 according to some examples. The process 300 can be performed by the deployment server 102, for example.

The process 300 includes deriving (at 302), by the deployment server including a hardware processor, an initialization vector (e.g., 216 in FIG. 2) based on a protection parameter (e.g., any of parameters 220, 222, 224, and 226 in FIG. 2) of a configuration file. "Deriving" an initialization vector can refer to computing the initialization vector based on various input values, which in some examples include applying functions (e.g., hash functions) on protection parameters of the configuration file.

The process 300 includes encrypting (at 304), by the deployment server, a vulnerable parameter (e.g., any of parameters 212 and 214 in FIG. 2) of the configuration file using the initialization vector and an encryption key (e.g., 204 in FIG. 2). "Encrypting" a parameter refers to scrambling or otherwise modifying the parameter into a different form, such that the scrambled or otherwise modified parameter cannot be recovered without the initialization vector or the encryption key (or a decryption key corresponding to the encryption key).

The process 300 includes producing (at 306) a protected configuration file including the protection parameter and the encrypted vulnerable parameter. "Producing" a protected configuration file refers to modifying a portion of a configuration file such that the modified portion differs from a corresponding portion of the configuration file, and the modified portion is protected against unauthorized access.

The process 300 includes sending (at 308), by the deployment server, the protected configuration file including the protection parameter and the encrypted vulnerable parameter to a device as part of an operation configuring the device according to the protected configuration file. "Sending" the protected configuration file can refer to communicating the configuration file over a communication medium such as the network 116 of FIG. 1. The device configured according to the protected configuration file can be a physical electronic device (e.g., any of 104-1 to 104-3 in FIG. 1) or a virtual device. In some examples, the protection parameter in the configuration file sent from the deployment server to the device is in plaintext.

In some examples, the deriving of the initialization vector includes applying a first hash function (e.g., any of 230, 232, 234, or 236) on a first protection parameter to produce a first hash value. The deriving of the initialization vector further includes applying a second hash function (e.g., another one of 232, 234, or 236) on the first hash value and a second protection parameter of the configuration file to produce a second hash value. The first hash function and the second hash function can be different types of hash functions (e.g., different types of SHA functions and/or other types of hash functions).

In some examples, the first hash function and the second hash function are part of a pipeline of hash functions (e.g., 218 in FIG. 2) that are applied on successive protection parameters of the configuration file to produce a plurality of hash values. The initialization vector is produced using a last hash value of the plurality of hash values produced by a last hash function of the pipeline of hash functions. A "last" hash function is the hash function that is at the end of the hash pipeline. In the example of FIG. 2, the last hash function is the hash function 236.

The beginning hash function in the pipeline of hash functions in the example of FIG. 2 is the hash function 230. The beginning hash function is applied on a protection parameter of the configuration file and a hashing initialization vector, such as 229 in FIG. 2. An intermediate or last hash function is applied on a protection parameter of the configuration file and a hash value produced by a prior hash function in the pipeline of hash functions. An "intermediate" hash function refers to a hash function (e.g., 232 or 234 in FIG. 2) in the pipeline between the beginning hash function and the last hash function.

In some examples, the encryption key includes a password in the configuration file, and the encrypting of the second parameter uses the encryption key including the password.

In some examples, the encryption key includes a cryptographically hashed version of a password in the configuration file, and the encrypting of the second parameter uses the encryption key including the cryptographically hashed version of the password. A "cryptographically hashed version"

of a password refers to a password hash produced by applying a cryptographic hash function on the password.

In some examples, the encrypting of the vulnerable parameter includes encrypting a cryptographic key in the configuration file. The cryptographic key is used by a device to perform encryption of information. An example of the cryptographic key is the public key 212 of FIG. 2.

In some examples, the protection parameter is a first protection parameter, the vulnerable parameter is a first vulnerable parameter, the device is a first device, the configuration file is a first configuration file, the initialization vector is a first initialization vector, and the encryption key is a first encryption key. The deployment server further derives a second initialization vector based on a second protection parameter of a second configuration file, encrypts a second vulnerable parameter of the second configuration file using the second initialization vector and a second encryption key, produces a second protected configuration file including the second protection parameter and the encrypted second vulnerable parameter, and sends the second protected configuration file including the second protection parameter and the encrypted second vulnerable parameter to a second device as part of an operation configuring the second device according to the protected second configuration file.

In some examples, the first encryption key is the same as the second encryption key, and the first initialization vector is different from the second initialization vector.

Figure 4:
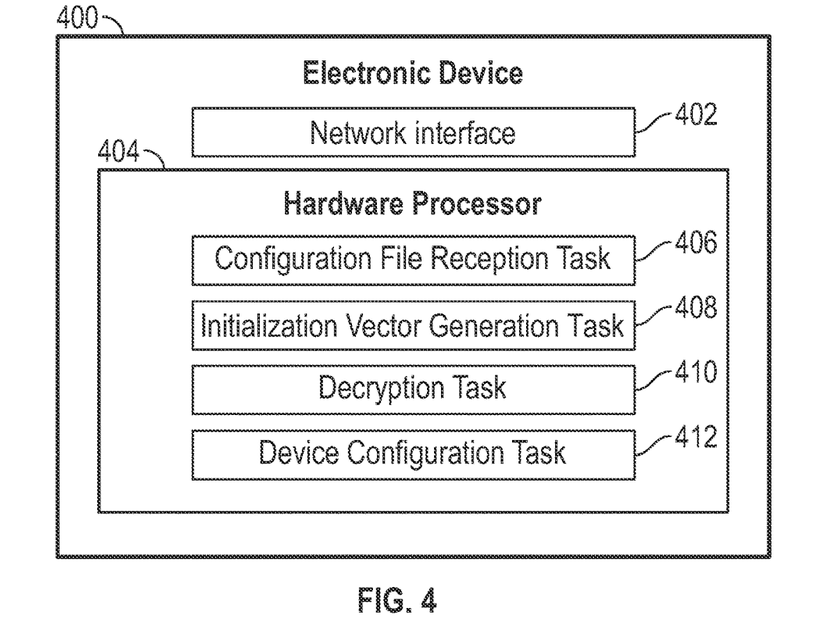
FIG. 4 is a block diagram of an electronic device according to some examples.

FIG. 4 is a block diagram of an electronic device 400 according to some examples. The electronic device 400 is an example of any of the electronic devices 104-1 to 104-3 of FIG. 1. The electronic device 400 includes a network interface 402 configured to communicate over a network with a deployment server (e.g., 102 in FIG. 1). The network interface 402 includes a transceiver to transmit and receive signals, and one or more protocol layers that manage communication of data according to communication protocols.

The electronic device 400 further includes at least one hardware processor 404 configured to perform various tasks. A hardware processor can include a microprocessor, a core of a multi-core microprocessor, a microcontroller, a programmable integrated circuit, a programmable gate array, or another hardware processing circuit.

The tasks of the least one hardware processor 404 include a configuration file reception task 406 to receive a configuration file (e.g., any of protected configuration files 118-1 to 118-3 in FIG. 1 or 202 in FIG. 2) including a protection parameter and an encrypted vulnerable parameter. An example of the protection parameter includes any of 220 to 226 in FIG. 2. An example of the encrypted vulnerable parameter includes any of 252 and 254 in FIG. 2.

The tasks of the least one hardware processor 404 include an initialization vector generation task 408 to generate an initialization vector (e.g., 216 in FIG. 2) using the protection parameter. "Generating" an initialization vector can refer to computing the initialization vector based on various input values, which in some examples include applying functions (e.g., hash functions) on protection parameters of the configuration file.

The tasks of the least one hardware processor 404 include a decryption task 410 to produce a decrypted vulnerable parameter by decrypting the encrypted vulnerable parameter using the initialization vector and an encryption key (e.g., 204 in FIG. 2). Decrypting an encrypted vulnerable parameter can refer to unscrambling or otherwise changing the encrypted vulnerable parameter into a plaintext version of the vulnerable parameter.

The tasks of the least one hardware processor 404 include a device configuration task 412 to configure the device using the decrypted vulnerable parameter. "Configuring" a device using a parameter can refer to adjusting a setting of a component of the device based on a value of the parameter.

Figure 5:
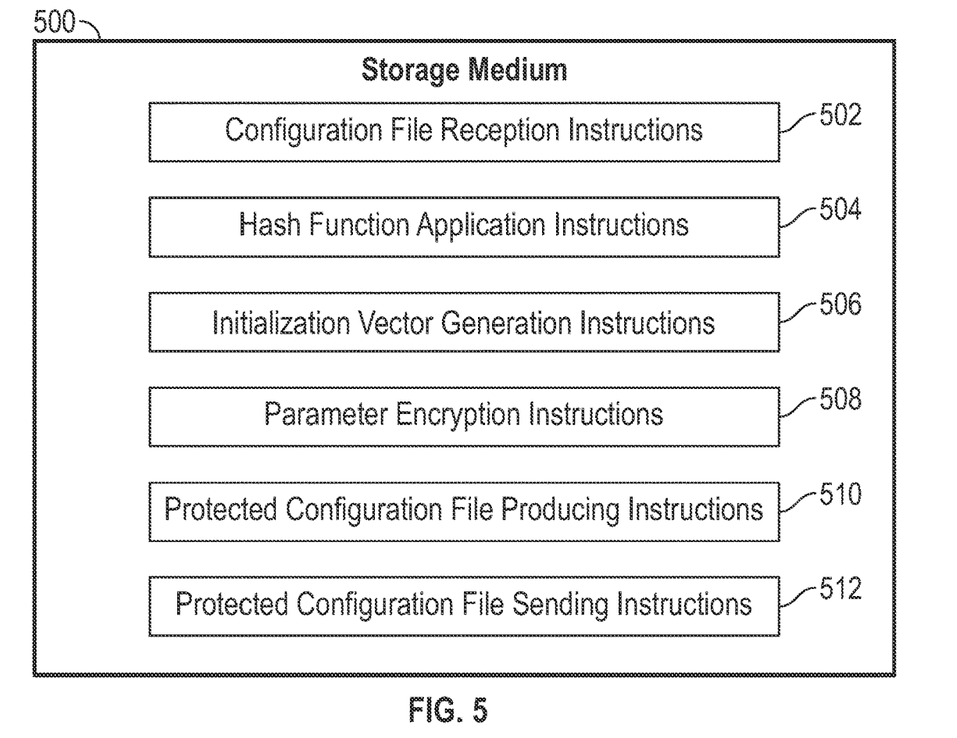
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a deployment server (e.g., 102 in FIG. 1) to perform various tasks. The machine-readable instructions include configuration file reception instructions 502 to receive a configuration file including a first collection of parameters (e.g., 206 in FIG. 2) and a second collection of parameters (e.g., 208 in FIG. 2). The configuration file can be retrieved from a storage location in the deployment server, or received from a location external of the deployment server.

The machine-readable instructions include hash function application instructions 504 to apply a pipeline of hash functions (e.g., 218 in FIG. 2) on the parameters of the first collection of parameters to produce a plurality of hash values (e.g., 240, 242, 244, 216 in FIG. 2). Applying a pipeline of hash functions can refer to applying hash functions in sequence according to an order of the hash functions.

The machine-readable instructions include initialization vector generation instructions 506 to generate an initialization vector based on the plurality of hash values. In some examples, the initialization vector includes or is derived from the last hash value from the last hash function in the pipeline of hash functions.

The machine-readable instructions include parameter encryption instructions 508 to encrypt the parameters of the second collection of parameters of the configuration file using the initialization vector and an encryption key.

The machine-readable instructions include protected configuration file producing instructions 510 to produce a protected configuration file comprising the first collection of parameters and the encrypted second collection of parameters.

The machine-readable instructions include protected configuration file sending instructions 512 to send, from the deployment server, the protected configuration file including the first collection of parameters and the encrypted second collection of parameters to a device as part of an operation configuring the device according to the protected configuration file.

A storage medium (e.g., 500 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   deriving, by a deployment server comprising a hardware processor, an initialization vector based on a protection parameter of a configuration file;
   encrypting, by the deployment server, a vulnerable parameter of the configuration file using the initialization vector and an encryption key;
   producing a protected configuration file comprising the protection parameter and the encrypted vulnerable parameter; and
   sending, by the deployment server, the protected configuration file comprising the protection parameter and the encrypted vulnerable parameter to a device as part of an operation configuring the device according to the protected configuration file.

2. The method of claim 1, wherein the deriving of the initialization vector comprises applying a hash function on the protection parameter to produce a hash value.

3. The method of claim 2, wherein the protection parameter is a first protection parameter, the hash function is a first hash function producing a first hash value based on the first protection parameter, and the deriving of the initialization vector comprises:
   applying a second hash function on the first hash value and a second protection parameter of the configuration file to produce a second hash value.

4. The method of claim 3, wherein the first hash function and the second hash function are part of a pipeline of hash functions that are applied on successive protection parameters of the configuration file to produce a plurality of hash values, the method comprising:
   producing the initialization vector using a last hash value of the plurality of hash values produced by a last hash function of the pipeline of hash functions.

5. The method of claim 3, wherein the first hash value is produced by applying the first hash function on the first protection parameter and a third protection parameter of the configuration file, the third protection parameter being a hashing initialization vector for the first hash function.

6. The method of claim 5, wherein the first hash value is produced by applying the first hash function on the first protection parameter, the third protection parameter, and a first salt, and
   wherein the second hash value is produced by applying the second hash function on the first hash value, the second protection parameter, and a second salt.

7. The method of claim 1, wherein the encryption key comprises a password in the configuration file, and the encrypting of the vulnerable parameter uses the encryption key comprising the password.

8. The method of claim 1, wherein the encryption key comprises a cryptographically hashed version of a password in the configuration file, and the encrypting of the vulnerable parameter uses the encryption key comprising the cryptographically hashed version of the password.

9. The method of claim 1, wherein the encrypting of the vulnerable parameter comprises encrypting a cryptographic key in the configuration file.

10. The method of claim 1, wherein the encrypting of the vulnerable parameter comprises encrypting one or more of a network address of a domain name server, location information of an executable script invocable by the device, location information of a package containing machine-readable instructions for installation in the device, an authentication parameter, or a network parameter relating to a network to be accessed by the device.

11. The method of claim 1, wherein the protection parameter is a first protection parameter, the vulnerable parameter is a first vulnerable parameter, the device is a first device, the configuration file is a first configuration file, the initialization vector is a first initialization vector, and the encryption key is a first encryption key, the method further comprising:
    deriving, by the deployment server, a second initialization vector based on a second protection parameter of a second configuration file;
    encrypting, by the deployment server, a second vulnerable parameter of the second configuration file using the second initialization vector and a second encryption key;
    producing a second protected configuration file comprising the second protection parameter and the encrypted second vulnerable parameter; and
    sending, by the deployment server, the second protected configuration file comprising the second protection parameter and the encrypted second vulnerable parameter to a second device as part of an operation configuring the second device according to the protected second configuration file.

12. The method of claim 11, wherein the first encryption key is the same as the second encryption key, and wherein the first initialization vector is different from the second initialization vector.

13. The method of claim 11, wherein the first protection parameter comprises a parameter of the first device, and the second protection parameter comprises a parameter of the second device.

14. The method of claim 1, wherein the protection parameter in the configuration file sent from the deployment server to the device is in plaintext.

15. The method of claim 1, wherein the device is a physical electronic device configured using the protected configuration file.

16. The method of claim 1, wherein the device is a virtual device configured using the protected configuration file.

17. An electronic device comprising:
    a network interface configured to communicate over a network with a deployment server;
    at least one hardware processor configured to:
        receive a configuration file comprising a protection parameter and an encrypted vulnerable parameter;
        generate an initialization vector using the protection parameter;
        produce a decrypted vulnerable parameter by decrypting the encrypted vulnerable parameter using the initialization vector and an encryption key; and configuring the electronic device using the decrypted vulnerable parameter.

18. The electronic device of claim 17, wherein the protection parameter is a first protection parameter, and the generating of the initialization vector comprises:
applying a first hash function on the first protection parameter and an input value to produce a first hash value,
applying a second hash function on a second protection parameter of the configuration file and the first hash value to produce a second hash value,
wherein the initialization vector is derived from the second hash value.

19. A non-transitory machine-readable storage medium comprising instructions that upon execution cause a deployment server to:
receive a configuration file comprising a first collection of parameters and a second collection of parameters;
apply a pipeline of hash functions on the parameters of the first collection of parameters to produce a plurality of hash values;
generate an initialization vector based on the plurality of hash values;
encrypt the parameters of the second collection of parameters of the configuration file using the initialization vector and an encryption key;
producing a protected configuration file comprising the first collection of parameters and the encrypted second collection of parameters; and
send, from the deployment server, the protected configuration file comprising the first collection of parameters and the encrypted second collection of parameters to a device as part of an operation configuring the device according to the protected configuration file.

20. The non-transitory machine-readable storage medium of claim 19, wherein the applying of the pipeline of hash functions on the parameters of the first collection of parameters comprises:
applying a first hash function on an input value and a first parameter of the first collection of parameters to produce a first hash value, and
applying a second hash function on the first hash value and a second parameter of the first collection of parameters to produce a second hash value,
wherein the first hash function is different from the second hash function, and the initialization vector is derived from the second hash value.

* * * * *